United States Patent [19]

Schaefer et al.

[11] Patent Number: 4,874,449

[45] Date of Patent: Oct. 17, 1989

[54] PROCESS FOR DRESSING A SUBSTANTIALLY FLAT SUBSTRATE SUCH AS SPLIT LEATHER OR A TEXTILE MATERIAL

[75] Inventors: Philipp Schaefer, Oberstrasse 16, D-3000 Hannover 1, Fed. Rep. of Germany; Helmut Schaefer, Avellino, Italy

[73] Assignee: Philipp Schaefer, Hannover, Fed. Rep. of Germany

[21] Appl. No.: 136,711

[22] Filed: Dec. 22, 1987

Related U.S. Application Data

[60] Continuation-in-part of Ser. No. 800,609, Nov. 21, 1985, abandoned, which is a division of Ser. No. 577,154, Feb. 6, 1984, Pat. No. 4,581,261.

[30] Foreign Application Priority Data

Aug. 4, 1983 [EP] European Pat. Off. ...... 83 89 0127.0

[51] Int. Cl.$^4$ .................. B29D 7/01; B32B 31/26; B32B 31/28
[52] U.S. Cl. .................. 156/246; 156/272.2; 156/275.5; 156/286; 156/289; 156/307.1; 156/315; 264/213
[58] Field of Search ............ 156/242, 246, 272.2, 156/274.4, 275.5, 285, 289, 286, 315, 153, 230, 231, 235, 239, 299, 307.1, 307.3, 314; 428/151, 408, 423.4, 473, 904; 264/212, 213

[56] References Cited

U.S. PATENT DOCUMENTS

| | | | |
|---|---|---|---|
| 3,493,451 | 2/1970 | Beery | 158/382 |
| 3,658,620 | 4/1972 | Hall | 158/246 |
| 3,660,218 | 5/1972 | Shepherd | 156/246 |
| 3,677,813 | 7/1972 | Eckert | 428/473 |
| 3,713,938 | 1/1973 | Sutton | 156/246 |
| 4,016,326 | 4/1977 | Schaefer | 428/423.4 |
| 4,065,340 | 12/1977 | Dickerson | 156/285 |
| 4,231,769 | 11/1980 | Toyama | 428/408 |

*Primary Examiner*—Merrell C. Cashion, Jr.
*Attorney, Agent, or Firm*—Herbert Dubno; Andrew Wilford

[57] ABSTRACT

In a process for dressing a substantially flat substrate having on at least one side a rough surface fibers protruding therefrom, there is first heated a support member, the upper side of which consists of silicone rubber having anti-adhesive properties and comprises small recesses for transmitting a pattern to said dressing, whereupon a first aqueous dispersion of synthetic plastics material is applied onto the upper side of this support member for forming a first layer of the dressing. Subsequently, this support member is heated from the bottom side located opposite the upper side of the support member at least till solidification of the first layer. Subsequently a second aqueous dispersion of synthetic plastics material is applied onto the solidified first layer or onto the rough surface of the substrate, said second dispersion forming a second layer of the dressing when having become solidified. In the following, the substrate is placed with its rough surface onto the solidified first layer, the applied second aqueous dispersion of synthetic plastics material still being in a wet stage. Subsequently, the support member is heated from its bottom side and a pressure is applied onto the upper side of the substrate during a time interval of at least 10 seconds, whereby the second aqueous dispersion of synthetic plastics material becomes solified. Subsequently, the substrate provided with the dressing is removed from the support member.

57 Claims, 3 Drawing Sheets

PROCESS FOR DRESSING A SUBSTANTIALLY FLAT SUBSTRATE SUCH AS SPLIT LEATHER OR A TEXTILE MATERIAL

CROSS REFERENCE TO RELATED APPLICATIONS

This application is a continuation in part application of Ser. No. 06/800,609 filed Nov. 21, 1985, now abandoned, which is a division of Ser. No. 06/557,154 filed Feb. 6, 1984, now U.S. Pat. No. 4,581,261.

The invention relates to a process for dressing a substantially flat substrate having on at least one side a rough surface with fibers protruding therefrom. The substrate is, in this case, either split leather or a textile material, in particular a fleece, having on at least one side a split leather-like appearance.

By means of dressing, the leather or the like shall be provided with a coating on its side in view, which coating has a nice appearance like leather, i.e. has the grain structure of leather or the velour structure of leather. This allows leather of minor quality, in particular split leather, to be used for example for producing shoes, thereby achieving, on the one hand, a nice appearance and fully maintaining, on the other hand, the properties of leather including its adsorbency, suppleness and strength.

BACKGROUND OF THE INVENTION

It is already known to upgrade split leather or leather hides having an injured surface by applying a coating in the form of a prefabricated film of synthetic plastics material. For this purpose, an adhesive is applied to the split leather, whereupon the film is placed thereon and glued to the split leather with a heated press. In this connection it is known to arrange within the press an embossing metal sheet for giving the film of synthetic plastics material during pressing a grain structure. For this purpose the film must be softened and the temperatures prevailing within the press are thus substantially elevated temperatures of approximately 170° C. Under the influence of these temperatures as well as under the influence of the compressing forces exerted within the press, the leather is strongly affected and is strengthened in an undesired manner.

It has also been proposed to use a high frequency plate press equipped with a mold of silicone rubber for glueing the film of synthetic plastics material to the split leather. The leather coated with an adhesive and having the film arranged thereon is, in this case, put into the cold mold of silicone rubber, whereupon high frequency heating is effected. Because the leather always contains moisture, the leather is also heated by the high frequency field and the above-mentioned drawbacks are thus not overcome.

Additionally, there is already known a process for dressing split leather in which the coating to be bonded to the split leather is formed from a polyurethane dispersion having incorporated therein hollow microspheres with shells consisting of synthetic plastics material or compact particles containing an inflating agent and forming hollow microspheres when is supplied heat; the shells of the hollow microspheres consists of a vinylidene chloride copolymer and have enclosed therein a gas, preferably air. The aqueous dispersion of a polyurethane is, in this case, applied either directly onto the leather to be coated or onto a removable supporting surface, noting that in the latter case the leather is placed on top of a layer of a polyurethane dispersion. The polyurethane dispersion is then allowed to solidify and any supporting surface is removed. With this known process, drying of the polyurethane dispersion applied onto the leather can be effected, for example, by means of a vacuum drying means, the water being removed through the layer of leather. Such known vacuum drying means are devices of the type used in the wet stage of tanneries for drying the leather from the still dripping wet condition after the tanning process. The leather, in a dripping wet condition, is arranged between a heated steel plate forming a support base and a felt-like porous sheet material, which is pressed against the leather, the vapor formed being sucked through the felt-like porous sheet material under the action of vacuum.

It is also known to provide a carrier layer with a cover layer of synthetic plastics material, having hollow microspheres embedded therein.

OBJECTS OF THE INVENTION

It is an object of the invention to provide a process for dressing a substantially flat substrate, in which process is reliably obtained an intimate and inseparable bond between the substrate and the dressing.

It is a further object of the invention to provide a process for dressing a substantially flat substrate, in which disturbing inclusions of gas or air between the substrate and the dressing are reliably prevented.

It is a further object of the present invention to provide a process for dressing a substantially flat substrate, in which the properties of the substrate are not changed in a disadvantageous manner upon application of the dressing and, in particular, the softness and suppleness of the leather is not adversely affected.

It is a further object of the invention to provide a process for dressing a substantially flat substrate having a nice appearance like that of leather at its surface facing the viewer.

It is a further object of the invention to provide a process for dressing a substantially flat substrate, whereby the dressing has a long life and a durable surface which resists damage except under severe stress.

It is a further object of the invention to provide a process for dressing a substantially flat substrate, which process allows dressing of the substrate in a simple manner and with simple equipment, thereby ensuring an unobjectional bond between the substrate and the dressing and reliably avoiding disturbing air bubbles and air inclusions between the dressing and the substrate.

BRIEF DESCRIPTION OF THE DRAWING

The annexed drawing illustrates an apparatus for carrying out the process of the invention, which process is explained with reference to the drawing. In the drawing FIG. 1 A-1C are a side elevational view illustrating three parts of an apparatus for carrying out the method of the invention.

SPECIFIC DESCRIPTION

Figure 1:
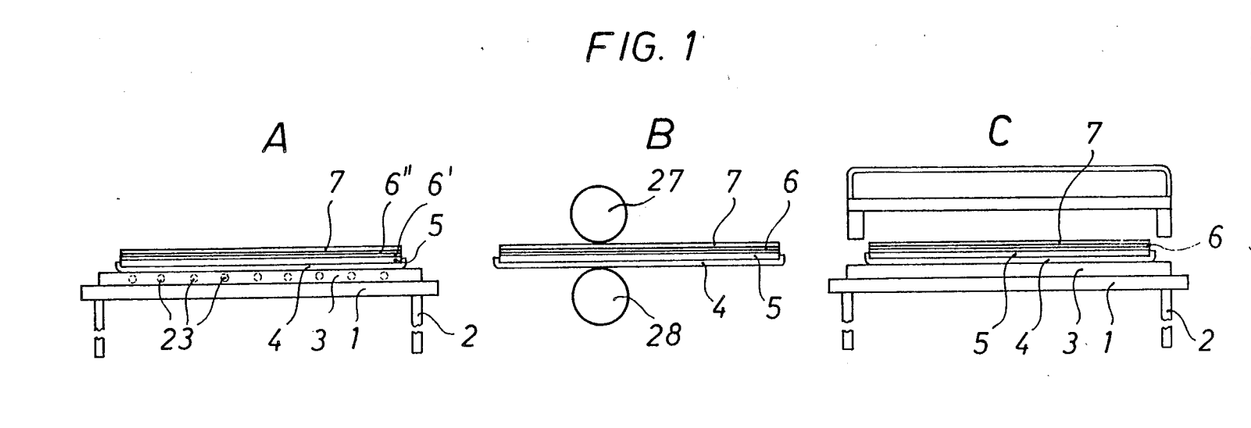
Figure 2:
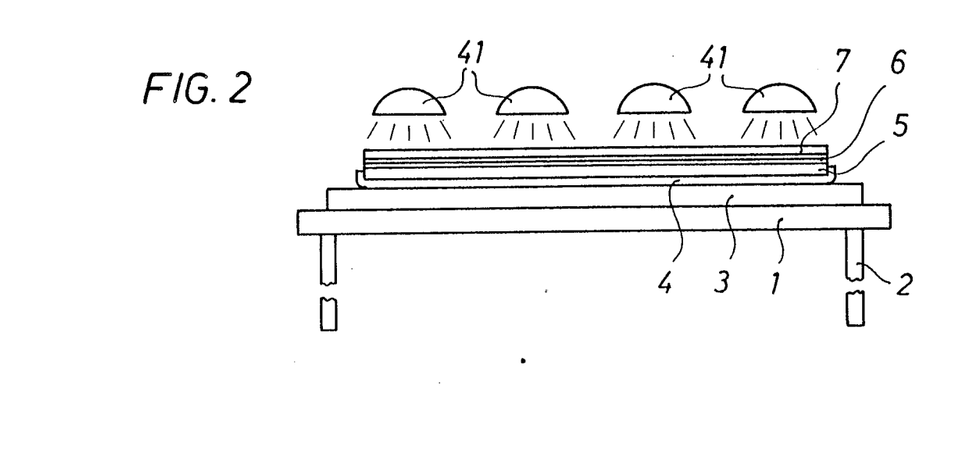
FIG. 2 shows another aspect of the apparatus in elevation.
Figure 3:
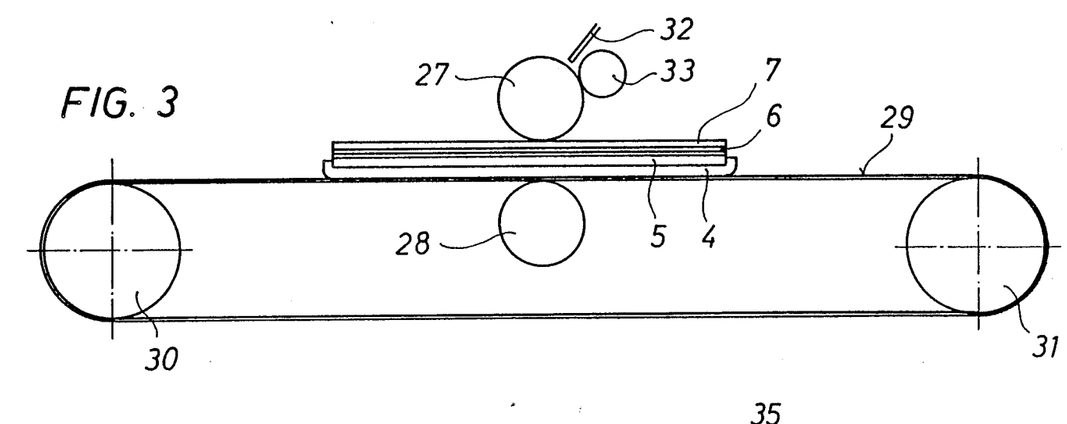
FIG. 3 represents in diagrammatic side elevation another embodiment.

FIG. 1 schematically shows an apparatus for carrying out the process of the invention composed of three components, i.e. a station for applying the dispersions of synthetic plastics material, a roller press and a vacuum device while FIG. 2 shoes a modified embodiment of the station for applying the dispersions of synthetic plastics material. FIG. 3 shows in a side elevation an embodiment of a roller press, and FIG. 4 shows a section through a first embodiment of a vacuum device for carrying out the inventive process, FIG. 5 is a partial top plan view of the vacuum device in direction of the arrow V in FIG. 4, FIG. 6 shows in a section a second embodiment of the vacuum device for carrying out the inventive process, and FIG. 7 shows in a section and in a substantially enlarged scale a dressed split leather.

Figure 4:
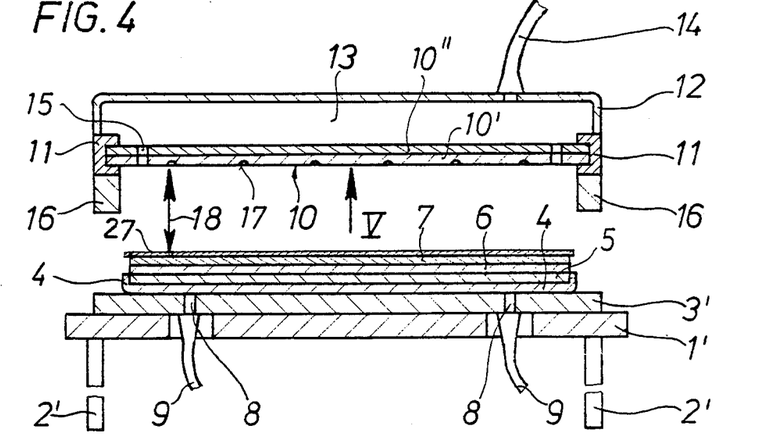
FIG. 4 is a section through a press according to the invention.
Figure 5:
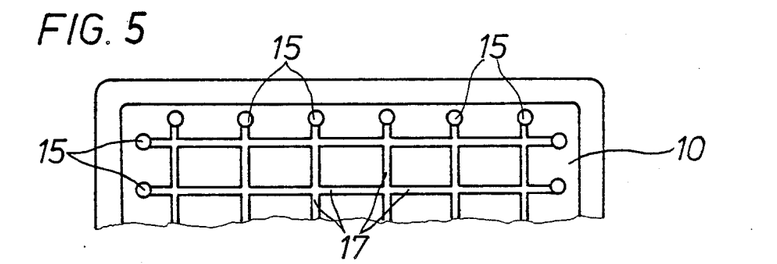
FIG. 5 is a partial plan view of a portion of a plate of the press.
Figure 6:
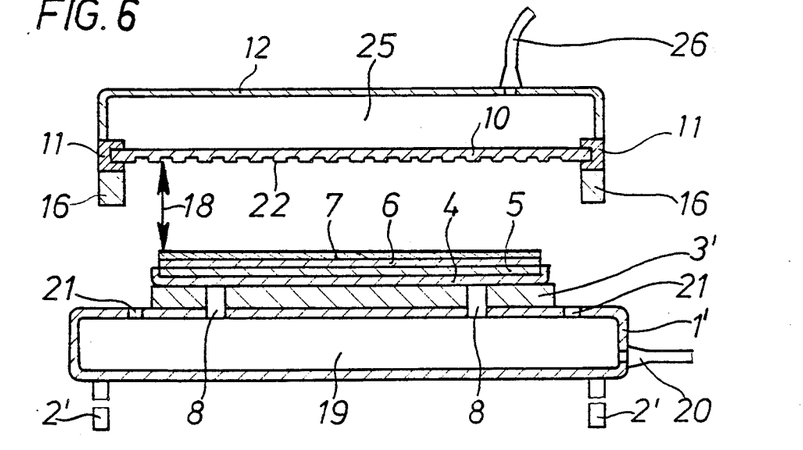
FIG. 6 is a view similar to FIG. 4 of another embodiment.
Figure 7:
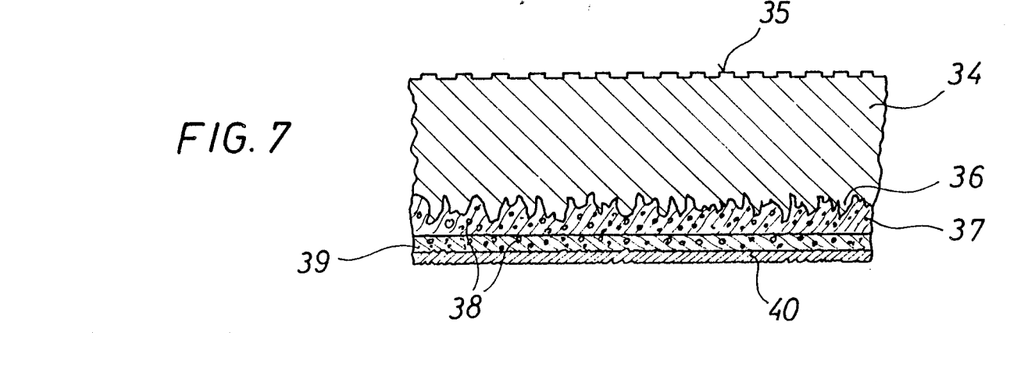
FIG. 7 is a section through the dressed split leather produced by a process according the invention.

As can be deduced from FIG. 1, the device for carrying out the method of the invention consists of a station A for applying the dispersion of synthetic plastics material, of a station B, i.e. a roller press, and of a station C, i.e. the vacuum device (see FIGS. 4-6).

The station A has a table 1 resting on feet 2. A heated metallic plate 3 is arranged on the table 1. Heating of the plate is, for example, effected by means of electric heating wires 23 embedded within the plate. A rigid support member 4 of, for example, aluminum sheet, rests on the heated plate 3 and supports a flexible support member 5, consisting of silicone rubber, having antiadhesive properties. The support member 5 has a structural shape at its upper surface, i.e. a surface showing small recesses, depressions or the like, which is transmitted to the dressing, so that the side in view of the dressing has then a leather-like appearance.

A first aqueous dispersion of synthetic plastics material, preferably containing polyurethane, is first applied onto the support member 5, having been already heated, in an amount to form from this first dispersion of synthetic plastics material a first cohesive layer 6' having a thickness within the range from 0.07 to 0.22 mm. This first dispersion of synthetic plastics material is allowed to solidify with formation of the mentioned layer 6', which is accelerated by heating of the support member 5 by means of the heated metallic plate 3.

The first aqueous dispersion of synthetic plastics material has preferably a content in solid material of at least 50%, said solid matter consisting at least partially of polyurethane. Furthermore, the first aqueous dispersion of synthetic plastics material may contain filler materials which may, for example, consists of cellulose fibers or of leather fibers. Finally, hollow microspheres having their shell consisting of a thermoplastic synthetic plastics material, for example of a polyvinylidene chloride copolymer, and containing within their interior a gas may be added to this first aqueous dispersion of synthetic plastics material for the purpose of obtaining a foam structure of the first layer 6' formed from this aqueous dispersion of synthetic plastics material. These hollow microspheres may also be formed in situ within the aqueous dispersion of synthetic plastics material by supplying heat, in which case there are added to the aqueous dispersion of synthetic plastics material compact particles of thermoplastic synthetic plastics material and containing an inflating agent.

Finally, it may be of advantage to add a wax to the aqueous dispersion of synthetic plastics material. Such addition may be effected by first dissolving the wax in a solvent, for example gasoline, and by removing the solvent after having added the mentioned solution. On account of the addition of the wax, that surface of the dressing which is visible for the viewer, is given a bright appearance of beautiful shape.

The first aqueous dispersion of synthetic plastics material is preferably sprayed onto the heated flexible support member, so that this dispersion af synthetic plastics material becomes rapidly solidified without being given the possibility to congregate under formation of pearls on the flexible support member 5 of silicone rubber having hydrophobic properties, which pearls would be a hindrance for a film formation. During solidification of this first aqueous dispersion of synthetic plastics material on the heated flexible support member 5, there is rather formed a homogenous film showing micropores formed on occasion of evaporating the water and reliably providing the desired permeability for air and steam.

Prior to applying the first aqueous dispersion of synthetic plastics material there can be applied to the heated flexible support member 5 a liquid synthetic plastics material, which, after having become solidified, forms a thin additional finish layer. This liquid synthetic plastics material conveniently consists of a polymer solution containing polyurethane.

After solidifying of the first aqueous dispersion of synthetic plastics material a second aqueous dispersion of synthetic plastics material is applied to the solidified first layer 6' in an amount approximately corresponding to the amount of the first dispersion of synthetic plastics material, whereupon the split leather is placed on this still wet second dispersion of synthetic plastics material. This second aqueous dispersion of synthetic plastics material forms—after having been solidified—a second layer 6", the split leather being designated by 7. Both layers 6',6" form together the dressing 6.

The type and the composition of the second aqueous dispersion of synthetic plastics material may correspond to the type and the composition of the first aqueous dispersion of synthetic plastics material. However, the second aqueous dispersion of synthetic plastics material conveniently contains no filler materials such as cellulose fibers or leather fibers and also no wax. It is, however, advantageous that this second aqueous dispersion of synthetic plastics material equally has a foam structure. This foam structure may again be obtained by adding the hollow microspheres or the compact particles from which the hollow microspheres are formed in situ by supplying heat. It is, however, also possible to obtain a foam structure in an other manner, for example by blowing or stirring air into the aqueous dispersion of synthetic plastics material prior to its application. Application of the second aqueous dispersion of synthetic plastics material is conveniently effected by pouring or wiping, but this second aqueous dispersion of synthetic plastics material may, of course, also be applied by spraying.

In place of split leather, there can also be used a textile material, in particular a fleece, having at least at the side to be connected with the dressing an appearance like split leather, i.e. comprises fibers protruding therefrom.

It is also possible to apply the second aqueous dispersion of synthetic plastics material onto the split leather 7 and to place the thus treated split leather with its side having applied thereon the second aqueous dispersion of synthetic plastics material in the wet stage upon the solidified first dispersion of synthetic plastics material.

In particular if the second aqueous dispersion of synthetic plastics material is applied onto the solidified first aqueous dispersion of synthetic plastics material it is of advantage to lower the temperature of the flexible support member 5, for example by blowing air against the flexible support member 5 having applied thereon the first layer 6'. Thus it is prevented that the applied second aqueous dispersion of synthetic plastics material becomes too rapidly solidified.

The rigid support member 4, the flexible support member 5, the dressing 6 consisting of said both layers 6', 6" and the split leather 7 can be subsequently slightly compressed one with the other within a roller press B comprising at least two rollers 27,28. Compressing is preferably performed such that a minor amount of the second dispersion of synthetic plastics material forming the second layer 6" is laterally expelled, thereby making sure that the fibers of the split leather 7 are at all areas immersed in the second aqueous dispersion of synthetic plastics material and become anchored within this second dispersion of synthetic plastics material after solidification of this second dispersion.

The roller press shown in FIG. 3 on a larger scale differs from the roller press B shown in FIG. 1 insofar as an endless conveyor belt 29 running over transport rollers 30, 31 is passed between both rollers 27, 28. A water supply means 32 as well as a cleaning roller 33 is additionally provided. A water-operated cleaning device is thus formed for cleaning the roller 27.

The rigid support member 4 together with the flexible support member 5 supporting the dressing 6 and the split leather 7 are located on the endless conveyor belt 29. These parts are thus passed between the rollers 27, 28, thus compressing the dressing 6 and the split leather 7 one with the other and expelling any included air. The roller 27 consists of elastic material, to be in the position to compensate any differences in thickness. It is, however, also sufficient if only the surface of the roller 27 consists of elastic material. For the same reason, at least one of the two rollers 27, 28 can be resiliently supported with bearings, i.e. be moved in a direction perpendicular to the transport direction of the conveyor belt 29 against the force of a spring. Of course, a plurality of roller pairs can also be arranged one behind the other for assuring a better compressing action.

The embodiment according to FIG. 2 differs from the embodiment of the station A in FIG. 1 insofar as, preferably in addition, infrared radiators 41 or equipment generating a high frequency field are arranged, which means equally effect heating and thus drying of the applied dispersions of synthetic plastics material.

The roller press may, however, also be omitted, because, as is described in the following with greater detail, application of pressure onto the upper surface of the split leather can also be effected by means of a flat, yielding pressing element snuggly contacting the surface of the split leather and being formed of a diaphragm 10 in the embodiment of the FIGS. 3 and 4. The use of other flat, yielding pressing elements snuggly contacting the surface of the split leather is, however, possible. For instance, a sheet of textile material, a lattice tape or the like may be used as such a pressing element, noting that the vapor generated during the solidification of the second aqueous dispersion of synthetic plastics material and at least partially penetrating the split leather may be removed via the meshes of the textile material or lattice tape, respectively.

The device shown in the shown FIGS. 3 and 4 has a table 1' supported with legs 2' and having arranged thereon a rigid, heated metallic plate 3'. Heating of this plate 3' is, for example, again effected by means of electric heating wires embedded within this plate. Heating can, however, also be effected in any other suitable manner. The rigid support member 4 rests together with the flexible support member 5 of silicone rubber on the heated plate 3'. The metallic plate 3' is heated such that the flexible support member 5 has a temperature of at least 85° C. but, however, not more than 115° C. The dressing 6 as well as the the split leather 7 is located on the flexible support member 5. The rigid support member 4 is removably arranged on the heated plate 3', so that the rigid support member 4 can, together with the flexible support member 5, the dressing 6 and the split leather 7, be placed upon the heated metallic plate 3'. The rigid support member 4 is then preferably maintained in position on the heated plate 3' under the action of vacuum. For this purpose, openings 8 are provided in the heating plate and connected via hoses 9 with known means, not shown, for generating a vacuum.

Opposite to the metallic plate 3', there is provided the flat, yielding dressing element snuggly contacting the upper surface of the split leather 7 and consisting of a diaphragm 10 clamped within a frame 11. The diaphragm 10 preferably consists of two layers 10', 10", the lower layer 10' being formed of a rubber optionally reinforced by insert members, preferably of silicone rubber. A cover 12 is provided above the frame 11 and encloses in cooperation with the diaphragm 10 a space 13 connected via a hose 14 with said means for generating a vacuum. Openings 15 being in connection with the space 13 are provided at the edge portion of the diaphragm 10. A seal 16 of pressure-elastic property and preferably equally consisting of silicone rubber is provided on the bottom surface of the frame 11.

The bottom side 10' of the diaphragm 10 is, at its surface opposite the metallic plate 3', provided with protrusions, between which grooves 18 are arranged according to the pattern of a grid and extending till the openings 15, so that generated vapor can escape via these grooves 17 and the openings 15 into the space 13 and from there be discharged via the hose 14.

The metallic plate 3' and the diaphragm 10 are arranged for being shifted one relative to the other in direction of the twin-arrow 18, noting that conveniently the metallic plate 3' can be shifted by a means, not shown, whereas the diaphragm 10 is stationarily arranged. If the diaphragm 10 contacts the split leather, a sealing 16 is provided between the diaphragm 10 and the metallic plate 3', so that a sealed cavity is formed which is in connection with the means for generating a vacuum via the openings 15 and the space 13 as well as the hose 14.

It is possible to provide, in place of the openings 15, openings (not shown) in the frame 11 and below the diaphragm 10, which openings are, at the outer side of the frame, connected via a hose with the means for generating a vacuum. In this case, the grooves 17 arranged according to a grit pattern must then be extended to that marginal area of the diaphragm 10 which does not contact the split leather 7.

By applying the vacuum, the diaphragm is pressed against the top surface of the split leather 7, noting that the elastic and thus yielding diaphragm 10 becomes adapted to any unevenness of this surface and presses against the heated flexible support member the split leather 7 together with the already solidified first layer 6' and the second dispersion of synthetic plastics material being just under the condition to form by solidification the second layer 6". The pressure exerted via the interpositioned diaphragm 10 is, in this case, selected so high that the fibers protruding from the split leather 7 are pressed in to the at least partially non-solidified second aqueous dispersion of synthetic plastics material, so that these fibers are completely embedded within the second layer 6" having become formed from said second aqueous dispersion of synthetic plastics material after its solidification. The pressure is maintained during a time interval of at last 10 seconds and conveniently amounts to at least 100 kg/m$^2$.

By using an aqueous dispersion of synthetic plastics material for forming the second layer 6" of the dressing 6, it is made sure that the split leather 7, which is to act as a filter, becomes not unduly hard when applying the pressure, noting that the solid material being incorporated into the second aqueous dispersion of synthetic plastics material are retained by the split leather but completely fill the interstices between the fibers protruding from the split leather, so that it is made sure that these fibers are completely embedded within the second layer 6" after its solidification. On account of heating this still partially non-solidified second dispersion of synthetic plastics material from below via the metallic plate 3', there is achieved that solidification of the second aqueous dispersion of synthetic plastics material first takes place within the area located adjacent the already solidified first layer 6' and subsequently proceeds in direction to the split leather 7, noting that the vapor formed on occasion of solidification flows in upward direction and is at least partially removed via the vaporpermeable leather and via the grooves 17 in the diaphragm, said vapor removal being assisted by the vacuum.

The use of vacuum device of the type shown in the FIGS. 4 and 5 is, however, not imperative, because the vapor can be removed without applying a vacuum and because pressure may be applied onto the diaphragm 10 also in an other manner, and may, for example, be mechanically applied.

It is convenient if an intermediate layer 27 of absorbing material, for example a paper sheet or a textile sheet, is arranged between the upper surface of the split leather 7 and the diaphragm 10. This intermediate layer 27, which preferably protrudes beyond the marginal edges of the split leather 7, does not only absorb at least part of the humidity passing the split leather and having its origin in the second aqueous dispersion of synthetic plastics material but also protects the diaphragm 10 against becoming contaminated by the excessive second aqueous dispersion of synthetic plastics material emerging at the edges of the split leather 7 when applying a pressure. The merging excess of this aqueous dispersion of synthetic plastics material adheres, after having become solidified, on the intermediate layer 27 and can be removed together with this intermediate layer when pulling off this intermediate layer after finished production of the dressed split leather, so that no finishing operation for the dressed split leather is necessary.

It is also not necessary that the heated metallic member 3', the flexible support member 5 and the flat, yielding pressing element snuggly contacting the surface of the split leather be plane. For example, the flexible support member 5 can be formed of a tape of silicone rubber being wound around a major portion of the circumference of a heated roll of great diameter and having a metallic surface. The laminar, yielding pressing element snuggly conttacting the surface of the split leather may equally be formed of a tape of rubber, of a textile material or of a wire mesh of small mesh size surrounding a major part of the circumference of said roll, noting that the pressure being exerted by means of this tape is effected by corresponding tensioning means. If the roll of great diameter is rotated with a low speed and if the tape forming the flexible support member 5 as well as the tape forming the pressing element run in synchronism with said roll, the pressure is maintained for the required time interval of at least 10 seconds also in this embodiment. Such an embodiment has the advantage that the dressed split leather can continuously be manufactured in a conveyor-line production.

In the embodiment according to FIG. 6, the metallic plate 3', the rigid support member 4 and the flexible support member 5 of silicone rubber are designed in the same manner as in the embodiment according to the FIGS. 4 and 5. The flexible support member 5 of silicone rubber again supports the dressing 6 and the split leather 7. In this embodiment, the table 1' having arranged thereon the metallic heated plate 3' is provided with an interior cavity 19 connected with the means for generating a vacuum via a hose connection 20. Openings 8 within the rigid heated plate 3', on the one hand, and further openings 21 arranged outside of the metallic heated plate 3', on the other hand, open into this cavity 19.

With this embodiment, the diaphragm 10 is formed of one single piece and again clamped into a frame 11. On the bottom side of the diaphragm there are provided—in place of the grooves 17 arranged according to the pattern of a grid—depressions 22 extending up to the frame 11. Also with this embodiment a pressure-elastic sealing 16, preferably of silicone rubber, is provided.

The metallic rigid plate 3' can again be moved relative to the diaphragm 10 and its frame 11 in direction of the twin-arrow 18, noting that it is convenient to lower in this case the frame 11 until the sealing 16 contacts the upper side of the table 1'. Subsequently a vacuum is applied via the conduit 20 and propagates with the frame 11 being lowered—into the cavity enclosed by the table plate and the diaphragm 10. The diaphragm 10 is thus drawn in downward direction and pressed onto the split leather 7. In this case the pressure acting on the split leather 7 becomes effective first in the center area and then outwardly thereof, because when applying a vacuum the center portion of the diaphragm 10 is sucked in downward direction first and it is only then that, starting from this center portion, the outer areas of the diaphragm are pressed against the split leather 7. This is of advantage because bubbles and gas inclusions formed in the dressing and in the bonding area between the dressing and the split leather are expelled.

At the upper side of the frame there can again be provided a cover lid 12 forming a cavity 25 above the diaphragm 10. A pressurized fluid, for example compressed air, can be supplied into this cavity 25 via a conduit 26, which provides the possibility to still further increase the pressure acting on the split leather 7 with interposition of the diaphragm 10.

With all embodiments it is possible to omit the rigid support member 4.

After complete solidification of the second aqueous dispersion of synthetic plastics material by applying pressure and by supplying heat in the described manner, the split leather being provided with the dressing 6 is removed from the flexible support member 5 and can be subjected to further processing.

The surface of dressing 6, which is visible to the eye, can be provided with a finish. This finis can, for example be formed by spraying onto the support member 5 consisting of silicone rubber, prior to applying the first aqueous dispersion, a polymer solution, in particular a solution of a polyurethane polymer, having a softening point of the layer of the first aqueous dispersion of synthetic plastics material. The finish conveniently consists of a cross-linked polyurethane having a softening point of less than 80° C. If the dressed substrate is used as a material for producing shoe soles of synthetic plastics material are applied by an injection molding process, for example shoe soles of polyurethane are applied by a foaming operation, it is in this case not necessary to apply an adhesive to the shoe upper prior to applying the sole by an injection molding process or a foaming process because the thermal properties of the finish can be made use of and the finish then acts like an adhesive.

While the second layer 6" of the dressing 6, which layer 6" provides a connection between the solidified first layer 6' and the split leather 7, is always formed of an aqueous dispersion of synthetic plastics material, the use of such an aqueous dispersion of synthetic plastics material is not imperative for forming the first layer 6'. This first layer can also be produced by applying onto the heated support member 5' in place of the first aqueous dispersion of synthetic plastics material a polyurethane-forming cross-linkable pre-polymer.

The dressed split leather 34 is shown in FIG. 7. This split leather has at its side 35 facing off the side provided with the dressing a structure being formed of the channel-like depressions 17 or, respectively, of the depressions provided on the diaphragm 10 of the vacuum device or the like. The fibers 36 protruding from the opposite surface of the split leather 34 are anchored within a second layer 37 being formed of the second applied dispersion of synthetic plastics material. This layer may comprise hollow microspheres 38, which impart a foam structure to this layer. The layer 37 has a thickness between 0.07 and 0.22 mm and is not or not pronouncedly thermoplastic, i.e. cross-linked from a low to a moderate degree.

The second layer 37 formed of the second applied dispersion of synthetic plastics material is inseparably connected with a first layer 39 being formed of the first applied dispersion of synthetic plastics material. Conveniently, hollow microspheres 38 are equally embedded within this first layer 39. Also this first layer 39 is not or not pronouncedly thermoplastic, i.e. cross-linked from a low to a moderate degree.

The first layer 39 forming the sight surface or visible surface of the dressed split leather has a structure corresponding to the structural surface of the flexible support member 5 of silicone rubber, i.e. and for example the grainy structure of leather or a structure corresponding to a velour leather.

The first layer 39 can be provided with a finish 40 which equally has a corresponding structure if the finish is formed by spraying a polymer solution onto the structural surface of the support member 5. The finish 40 has preferably a thickness of less than 0.1 mm and conveniently consists of polyurethane or at least contains polyurethane.

EXAMPLE 1

A 18% solution of a polymer consisting of polyurethane and nitrocellulose is sprayed onto a support member 5 of silicone rubber, the support member showing on its surface the negative after-image of a leather structure. The polymer solution, is subsequent to spraying, dried in a heating channel by means of forced air, so that a film is formed weighing approximately 25 g/m$^2$. Subsequently, an approximately 50% dispersion based on polyurethane is applied onto said film by spraying in a thickness of approximately 0.2 mm. Also this dispersion is dried by heating a metall plate on which the support member 5 rests, forming a solidified first layer. The dispersion contains approximately 8% by volume of hollow microspheres having a shell of a polyvinylidene chloride copolymer and further contains approximately 3 % of a cross-linking composition of sulfur and a zinc compound and additionally contains approximately 4 parts of carbon black as a pigment. After solidification of this first layer a second dispersion of the same composition is poured onto said solidified first layer, which second dispersion contains also hollow microspheres. Immediately thereafter a split leather is put on the still wet second dispersion and pressed onto the dispersion such that after the pressing operation approximately 15 g of the dispersion are squeezed out at the end portions, as seen in transport direction. Subsequently, the split leather provided with the coating is treated in a vacuum device, the heated plate of which has a temperature of approximately 90° C.

EXAMPLE 2

A polymer solution containing polyurethane and approximately 15% solid material in total is sprayed in an amount of about 150 g/m$^2$ onto a support member 5 of silicone rubber and having a structured surface. After solidification of this solution, a first aqueous dispersion consisting of 40% polybutadiene, of 40% polyacrylate and of 20% polyurethane is applied by spraying onto the film obtained on drying the polymer solution, and this in amount of 200 g/m$^2$. The first dispersion contains 3%, based on the total weight, of polyvinylidene chloride particles containing an inflating agent. The content of this mixed first dispersion in solid matter is approximately 55%. The layer of applied first dispersion is subsequently placed, together with the structural support member 5, onto a conveyor belt 29 and passed by means of this conveyor belt through a high frequency field with a speed of 3 m/min. The high frequency field is generated by means of a 12 kW-generator. The support member 5 of silicone rubber having a thickness of approximately 2 mm and showing a structural surface is not or scarcely heated and this applies also to the layer formed of the polymer solution, however, the first layer formed from the first dispersion is heated to approxomately 100° C. on account of the dielectric polyacrylate and the water present. The first layer formed from the first dispersion is thus dried and hollow microspheres are simultaneously formed from the compact particles. The dried layer has a thickness of approximately 0.22 mm. If no compact particles are used, the thickness of the layer of applied dispersion would be 0.2 mm in wet condition, which thickness would be reduced down to approximately 0.11 mm in a dry condition.

A second dispersion containing 50% polybutadiene and about 8% by volume of hollow microspheres is applied onto the solidified first layer of dispersion in an amount of approximately 150 g/m². Subsequently, the split leather is placed onto this still wet second dispersion. This is followed by a further treatment in the roller press and thereafter, together with the support member 5, in the vacuum device, the metal plate 3 of which has a temperature of 115° C. After a time interval of approximately 50 s, the finished dressed split leather can be removed from the vacuum device and be taken from the support member 5.

EXAMPLE 3

In the manner described in example 1, a polymer solution forming the first layer is first applied onto a support member 5 of silicone rubber and showing a structural surface, whereupon a dispersion of synthetic plastics material forming the second layer is applied onto the solidified first layer. In place of the split leather an elastic fabric having elastomeric fibers of polyurethane extending in longitudinal direction is placed on the dispersion applied as the last layer and being still in a wet condition. The fabric is, prior to being placed on the wet layer, extended or elongated in its longitudinal direction for 80% and clamped in this elongated condition within a very flat frame of synthetic plastics material. After the woven fabric clamped in the frame is applied, further treatment is effected within the vacuum device. After completed further treatment in the vacuum device, the elastic dressed woven fabric is, together with the frame being somewhat greater than the support member 5, taken from this support member, whereupon the fabric is taken out of the frame. The dressed fabric nearly completely restores its original length as seen in longitudinal direction. This is possible because the dressing can be crushed in itself and is soft. The thus dressed material can be elastically elongated as frequently as desired and always restores its original shape.

What we claim is:

1. A process for forming a dressing on a substantially flat substrate having on at least one side a rough surface with fibers protruding therefrom, such as split leather or a textile material having on at least one side a split-leather-like appearance, the process comprising the steps of sequentially:

heating a support member having an upper side consisting of silicone rubber having antiadhesive properties and formed with small recesses for transmitting a pattern to said dressing;

applying a first aqueous dispersion of synthetic plastics material onto the upper side of the heated support member for forming a layer of the aqueous dispersion which, as a result of the heat of the support member, forms a cohesive solidified first layer of the dressing having a thickness between 0.07 mm and 0.22 mm;

further heating this support member from a bottom side opposite the upper side of the support member at least until the solidification of the first layer is complete;

applying a second aqueous dispersion of synthetic plastics material onto the solidified first layer;

placing the substrate with its rough surface onto the solidified first layer while the applied second dispersion of synthetic plastics material is still in a wet stage, whereby the fibers of the rough surface are immersed in the wet second dispersion;

heating the support member from the bottom side together with the solidified first layer, with the second aqueous dispersion, and with the substrate to a temperature of at least 85° C. so the second dispersion solidifies to form a second layer and applying a pressure onto an upper side of the substrate opposite the rough surface by means of a laminar, yielding pressing element during a time interval of at heating the support member from the bottom side together with the solidified first layer, with the aqueous dispersion, and with the substrate to a temperature of at least 85° C. so the second dispersion solidifies to form a second layer and applying a pressure onto the upper side of the substrate opposite the rough surface by means of a laminar yielding pressing element during a time interval of at least 10 seconds, whereby vapor generated during the solidification of the second layer is at least partially removed via the substrate; and removing from the support member the substrate provided with the dressing formed by the solidified first and second layers.

2. A process according to claim 1 wherein the support member is heated to a maximum temperature of 115° C. at least during application of pressure onto the upper side of the substrate.

3. A process according to claim 1 wherein the applied pressure is at least 100 kg/m².

4. A process according to claim 1 wherein the support member is supported on a heated metallic carrier member at least while supplying a pressure onto the upper side of the substrate, said carrier member transmitting its heat onto the support member.

5. A process according to claim 1 wherein the substrate is, together with the first layer and the second aqueous dispersion of synthetic plastic materials forming the second layer, subjected to a vacuum treatment during applying the pressure.

6. A process according to claim 1 wherein the laminar, yielding pressing element snugly contacting the substrate comprises, at its surface facing the substrate, protrusions between which channels are formed for the escape of the vapor.

7. A process according to claim 1 wherein a diaphragm is used as the laminar, yielding pressing element snugly contacting the substrate.

8. A process according to claim 7 wherein channel-like depressions are provided in the diaphragm.

9. A process according to claim 1 wherein a yieldable absorbing material is arranged between the upper side of the substrate and the laminar, yieldable pressing element snugly contacting the substrate.

10. A process according to claim 9 wherein the yielding absorbing material consists of a paper sheet.

11. A process according to claim 9 wherein the yielding absorbing material consists of a textile material.

12. A process according to claim 1 wherein the first layer and the second layer are formed of a cross-linkable non-thermoplastic synthetic plastics material.

13. A process according to claim 1 wherein the applied pressure presses the fibers protruding from the substrate completely into the second layer.

14. A process according to claim 1 wherein means are provided for removing the vapor during application of the pressure.

15. A process according to claim 1 wherein, prior to applying the aqueous dispersion of synthetic plastics material forming the first layer onto the support member, a liquid synthetic plastics material forming a finish layer is applied onto the support member.

16. A process according to claim 15 wherein the liquid synthetic plastics material forming the finish layer consists of a solution of a polymer.

17. A process according to claim 15 wherein the liquid synthetic plastics material forming the finish layer contains polyurethane.

18. A process according to claim 1 wherein at least one of the aqueous dispersion of synthetic plastics material contains additives giving rise to the formation of a foam structure.

19. A process according to claim 18 wherein air is incorporated into at least one of the aqueous dispersions of synthetic plastics material prior to applying said dispersions.

20. A process according to claim 18 wherein at least one of the aqueous dispersions of synthetic plastics material contains hollow microspheres having thin shells consisting of a thermoplastic synthetic plastics material and interiors containing a gas.

21. A process according to claim 18 wherein compact particles of synthetic plastics material containing an inflating agent are added to at least one of the aqueous dispersions of synthetic plastics material, the process further comprising the step of heating the compact particles to transform them into hollow microspheres of thermoplastic synthetic plastics material.

22. A process according to claim 1 wherein at least the aqueous dispersion of synthetic plastics material forming the first layer contains filler materials.

23. A process according to claim 22 wherein at least the aqueous dispersion forming the first layer contains cellulose fibers.

24. A process according to claim 22 wherein at least the aqueous dispersion forming the first layer contains leather fibers.

25. A process according to claim 1 wherein a wax is added at least to the aqueous dispersion of synthetic plastics material forming the first layer.

26. A process according to claim 1 wherein the temperature of the support member is lowered after the solidification of the aqueous dispersion of synthetic plastics material forming the first layer and prior to applying the aqueous dispersion of synthetic plastics material forming the second layer.

27. A process according to claim 1 wherein heating is effected at least partially by infrared radiation.

28. A process according to claim 1 wherein heating is effected at least partially by a high frequency field.

29. A process according to claim 1 wherein at least a part of the aqueous dispersion of synthetic plastics material forming the first layer is sprayed onto the supporting member.

30. A process according to claim 1 wherein at least one of said both aqueous dispersions of synthetic plastics material contains polyurethane.

31. A process according to claim 1 wherein at least one of said both aqueous dispersions of synthetic plastics material contains polybutadiene.

32. A process according to claim 1 wherein at least one of said both aqueous dispersions of synthetic plastics material has a solid matter content of more than 50%.

33. A process for dressing a substantially flat substrate having on at least one side a rough surface with fibers protruding therefrom, such as split leather or a textile material having on at least one side a split-leather-like appearance, comprising the steps of:

heating a support member having an upper side consisting of silicone rubber having antiadhesive properties and which has small recesses for transmitting a pattern to said dressing;

applying a polyurethane-forming cross-linkable pre-polymer onto the upper side of the heated support member for forming a layer of the aqueous dispersion which, as a result of heat of the support member forms a cohesive solidified first layer of the dressing having a thickness between 0.07 and 0.22 mm is formed;

further heating the support member from a bottom side thereof located opposite the upper side of the support member at least until solidification of the first layer is complete;

subsequently applying an aqueous dispersion of synthetic plastics material onto the solidified first layer so that said aqueous dispersion of synthetic plastics material forms a second layer of the dressing on said first layer;

thereafter placing the substrate with its rough surface onto the second layer while the applied dispersion of synthetic plastics material of the second layer is still in a wet stage;

subsequently heating the support member from the bottom side together with the solidified first layer, with the aqueous dispersion forming the second layer and with the substrate to a temperature of at least 85° C. and applying a pressure onto the upper side of the substrate by means of a laminar yielding pressing element snuggly contacting a surface of the substrate opposite said rough surface during a time interval of at least 10 seconds so that vapor generated during the solidification of the second layer is at least partially removed via the substrate; and finally removing from the support member the substrate provided with the dressing.

34. A process according to claim 33, wherein a cross-linkable pre-polymer free of solvents is used for forming the first layer of the dressing.

35. A process according to claim 33 wherein a cross-linkable prepolymer of a solvent content of at most about 18% is used for forming the first layer of the dressing.

36. A process for forming a dressing on a substantially flat substrate having on at least one side a rough surface with fibers protruding therefrom, such as split leather or a textile material having on at least one side a split-leather-like appearance, the process comprising the steps of sequentially:

heating a support member having an upper side consisting of silicone rubber having antiadhesive properties and formed with small recesses for transmitting a pattern to said dressing;

applying a first aqueous dispersion of synthetic plastics material onto the upper side of the heated support member for forming a layer of the aqueous dispersion which, as a result of heat of the support member, forms a cohesive solidified first layer of the dressing having a thickness between 0.07 mm and 0.22 mm;

further heating the support member from a bottom side thereof opposite the upper side of the support member at least until solidification of the first layer is complete;

applying a second aqueous dispersion of synthetic plastics material onto the rough surface of the substrate, which second aqueous dispersion of synthetic plastics material is adapted when dried and solidified to form a second layer of the dressing;

placing the substrate with the second dispersion thereon onto the solidified first layer while the applied second dispersion of synthetic plastics material is still in a wet stage so that the fibers of the substrate are immersed in the second dispersion and said second dispersion lies on said first layer;

heating the support member from the bottom side together with the solidified first layer, with the aqueous dispersion, and with the substrate to a temperature of at least 85° C. so the second dispersion solidifies to form a second layer and applying a pressure onto the upper side of the substrate opposite the rough surface by means of a laminar yielding pressing element during a time interval of at least 10 seconds, whereby vapor generated during the solidification of the second layer is at least partially removed via the substrate; and removing from the support member the substrate provided with the dressing formed by the solidified first and second layers.

37. A process according to claim 36 wherein the support member is heated to a maximum temperature of 115° C. at least during application of pressure onto the upper side of the substrate.

38. A process according to claim 36 wherein the applied pressure is at least 100 kg/m$^2$.

39. A process according to claim 36 wherein the support member is supported on a heated metallic carrier member at least while supplying a pressure onto the supper side of the substrate, said carrier member transmitting its heat onto the support member.

40. A process according to claim 36 wherein the substrate is, together with the first layer and the second aqueous dispersion of synthetic plastic materials forming the second layer, subjected to a vacuum treatment during applying the pressure.

41. A process according to claim 36 wherein the laminar, yielding pressing element snugly contacting the substrate cmprises, at its surface facing the substrate, protrusions between which channels are formed for the escape of the vapor.

42. A process according to claim 36 wherein a diaphragm is used as the laminar, yielding pressing element snugly contacting the substrate.

43. A process according to claim 42 wherein channel-like depressions are provided in the diaphragm.

44. A process according to claim 36 wherein a yieldable absorbing material is arranged between the upper side of the substrate and the laminar, yieldable pressing element snugly contacting the substrate.

45. A process according to claim 44 wherein the yielding absorbing material consists of a paper sheet.

46. A process according to claim 44 wherein the yielding absorbing material consists of a textile material.

47. A process according to claim 36 wherein the first layer and the second layer are formed of a cross-linkable non-thermoplastic synthetic plasctics material 48. A process according to claim 36 wherein the applied pressure presses the fibers protruding from the substrate are completely into the second layer.

49. A process according to claim 36 wherein means are provided for removing the vapor during application of the pressure.

50. A process according to claim 36 wherein, prior to applying the aqueous dispersion of synthetic plastics material forming the first layer onto the support member, a liquid synthetic plastics material forming a finish layer is applied onto the support member.

51. A process according to claim 50 wherein the liquid synthetic plastics material forming the finish layer consists of a solution of a polymer.

52. A process according to claim 50 wherein the liquid synthetic plastics material forming the finish layer contains polyurethane.

53. A process according to claim 36 wherein at least one of the aqueous dispersions of synthetic plastics material contains additives giving rise to the formation of a foam structure.

54. A process according to claim 53 wherein air is incorporated into at least one of the aqueous dispersions of synthetic plastics material prior to applying said dispersions.

55. A process according to claim 53 wherein at least one of the aqueous dispersions of synthetic plastics material contains hollow microspheres, the thin shell of each of which consists of a thermoplastic synthetic plastics material and the interior of each of which contains a gas.

56. A process according to claim 53 wherein compact particles of synthetic plastics material containing an inflating agent are added to at least one of the aqueous dispersions of synthetic plastics material, the process further comprising the step of heating the compact particles to transform them into hollow microspheres of thermoplastic synthetic plastics material.

57. A process for forming a dressing on a substantially flat substrate having on at least one side a rough surface with fibers protruding therefrom such as split leather or a textile material having on at least one side a split-leather-like appearance, the process comprising the steps of sequentially:

heating a support member having an upper side consisting of silicone rubber having antiadhesive properties and formed with small recesses for transmitting a pattern to the dressing;

applying a polyurethane-containing cross-linkable prepolymer onto the upper side of the heated support member for forming a layer of the polyurethane-containing cross-linkable prepolymer which, as a result of the heat of the support member, forms a cohesive solidified first layer of the dressing having a thickness between 0.07 mm and 0.22 mm;

further heating this support member from a bottom side thereof opposite the upper side of the support member at least until solidification of the first layer is complete;

applying an aqueous dispersion of synthetic plastics material onto the rough surface of the substrate, which aqueous dispersion of synthetic plastics material is adapted when dried and solidified to form a second layer of the dressing;

placing the substrate with the aqueous dispersion thereon on to the solidified first layer while the applied dispersion of synthetic plastics material is still in a wet stage so that the fibers of the substrate are immersed in the aqueous dispersion and the aqueous dispersion lies on the first layer;

heating the support member from the bottom side together with the solidified first layer, with the aqueous dispersion, and with the substrate to a temperature of at least 85° C. so that the dispersion solidifies to form a second layer and applying a pressure onto the upper side of the substrate opposite the rough surface by means of a laminar yielding pressing element during a time interval of at lest 10sec, whereby vapor generated during the solidification of the second layer is at least partially removed via the substrate; and removing from the support member the substrate provided with the dressing formed by the solidified first and second layers.

* * * * *

UNITED STATES PATENT AND TRADEMARK OFFICE
CERTIFICATE OF CORRECTION

PATENT NO.  : 4,874,449

DATED       : October 17, 1989

INVENTOR(S) : Philipp Schaefer, et al

It is certified that error appears in the above-identified patent and that said Letters Patent is hereby corrected as shown below:

Claim 1, under column 12,

Delete line 3 starting with "heating" up to and ending with "at" on line 11.

Signed and Sealed this

Twenty-fifth Day of September, 1990

*Attest:*

HARRY F. MANBECK, JR.

*Attesting Officer*  *Commissioner of Patents and Trademarks*